United States Patent [19]

Fears

[11] Patent Number: 5,417,820
[45] Date of Patent: May 23, 1995

[54] METHOD TO PREVENT ADHERENCE OF MARINE ORGANISMS ON SURFACES OF SUBMERGED COMPONENTS

[76] Inventor: Clois D. Fears, 407 Cole Rd., Murrysville, Pa. 15668

[21] Appl. No.: 203,682

[22] Filed: Feb. 28, 1994

Related U.S. Application Data

[63] Continuation-in-part of Ser. No. 922,799, Jul. 31, 1992, abandoned.

[51] Int. Cl.$^6$ .............................................. C23F 13/00
[52] U.S. Cl. ..................................... 204/147; 204/196
[58] Field of Search ................ 204/147, 148, 196, 197

[56] References Cited

U.S. PATENT DOCUMENTS

| | | | |
|---|---|---|---|
| 843,357 | 2/1907 | Partee et al. | 204/147 |
| 948,355 | 2/1910 | Tatro et al. | 204/147 |
| 994,405 | 6/1911 | James | 204/196 |
| 1,021,734 | 3/1924 | Delius et al. | 204/147 |
| 1,608,709 | 11/1926 | Mills | 204/197 |
| 3,010,886 | 11/1961 | Chappell | 204/196 |
| 3,303,118 | 2/1967 | Anderson | 204/196 |
| 3,661,742 | 5/1972 | Osborne et al. | 204/196 |
| 4,196,064 | 4/1980 | Harms et al. | 204/196 |
| 4,689,127 | 8/1987 | McAlister | 204/147 |
| 5,182,007 | 1/1993 | Takagi et al. | 204/196 |

OTHER PUBLICATIONS

Hart, "Invasion of the Zebra Mussel", *The Atlantic Monthly*, Jul. 1990, pp. 81–87.
Audobon, "Talk of the Trail", Sep., 1990, pp. 8, 10.
Reynolds, "Invasion of the Zebra Mussels", *Discover*, Jan., 1991, p. 44.
Bretz, "Zebra Mollusks: A Danger of a Different Stripe", Dec., 1990, pp. 72–74.
Steacy, "An Alien Invasion", *Macleans*, Nov. 6, 1989.
Cowley, "Showdown at Mussel Beach", *Neweek*, Nov. 20, 1989, p. 66.
"Zebra Mussels Show up 965 Miles Downstream", *Pittsburgh Post Gazette*, Sep., 1992.
Fleming, "Ballast Water Stowaways", *Sea Frontiers*, Jun., 1991, p. 23.
"The Fleet Strikes Back at Zebra Mussels", *Seaway Review*, Oct.–Dec., 1991, p. 83.
Walker, "Dreissena Disaster: Scientists Battle on Invasion of Zebra Mussels", *Science News*, vol. 139, May, 1991, pp. 282–284.
Laszewski, "Striped Menace: Zebra Mussels Found in Mississippi River; Minn, Lakes Next Likely Target, Says Expert", *Underwater USA*, Nov., 1991, p. 20.

*Primary Examiner*—T. Tung
*Attorney, Agent, or Firm*—James Ray & Associates

[57] ABSTRACT

A method of minimizing adherence of living marine organisms on exposed surfaces of a component submerged in a fluid medium containing such organisms is provided. The method simultaneously minimizes danger to higher forms of animal life present in the fluid medium. The method includes determining the component to be protected and its size and shape. In addition, the material such component is manufactured from is determined. At least one electrode is positioned adjacent an exposed surface of the component to be protected. A system to create a current flow path is provided by positioning a second electrode spaced from the other electrode also adjacent the exposed surface of the component when it is determined that the material the component is manufactured from is non conductive. On the other hand, when the component is manufactured from a material capable of conducting a current therethrough it may be used as one of the electrodes. A voltage is applied to the system to create a current flow path. In this manner, an electrical field is generated which has an intensity at least sufficient to cause the organisms to close.

23 Claims, No Drawings

METHOD TO PREVENT ADHERENCE OF MARINE ORGANISMS ON SURFACES OF SUBMERGED COMPONENTS

This is a continuation-in-part of application Ser. No. 07/922,799 filed on Jul. 31, 1992, now abandoned.

FIELD OF THE INVENTION

The present invention relates, in general, to control of living marine organisms and, more particularly, this invention relates to a method of control which will substantially minimize the undesirable adherence to and buildup of such living marine organisms on the exposed surfaces of various components and/or structures which are submerged in a fluid medium containing the living marine organisms therein while simultaneously this method, as opposed to a number of presently used methods, will minimize the danger to higher forms of animal life which may also be present in such fluid medium.

BACKGROUND OF THE INVENTION

In modern power generation plants and other manufacturing industries that require large volumes of water, there is a widely recognized problem that there is a potential loss of water caused by the adherence to and buildup of a variety of foreign substances on the exposed surfaces of fluid transport systems. The exposed surfaces, of the fluid transport systems, include, but are not necessarily limited thereto, the inner surfaces of the water intake pipes, valves, fittings, heat exchangers, etc, and the outer surfaces of screens (rotary & bar), etc.. Power generating plants and other manufacturing facilities which require the use of a particular fluid medium, such as fresh water, have long sought an effective method of maintaining these fluid transport systems operational and free of any buildup of foreign organisms and/or other debris.

One such foreign organism of particular concern, which were discovered recently in North American lakes and streams, is the Zebra Mollusks. Such Zebra Mollusks are better known in the art as Zebra Mussels. See, for example, an article published in the December 1990 issue of "Electrical World" pages 72–74 and an article published in the July 1990 issue of "The Atlantic Monthly" on pages 81–87. The disclosures of these particular articles are incorporated herein by reference thereto.

Prior to the present invention, when the fluid transport systems, of current technology, exhibit diminished capacity due to clogging by foreign substance buildup, one method of servicing a submerged piping system would be to have a person manually pull a dragging device through the fluid transport system to dislodge the buildups and/or clogs and subsequently pull them through to the exit end of the piping system for manual cleanup. Serious drawbacks to this prior art method are readily apparent and would at least include the fact that this method is not only labor-intensive but also time-consuming. In addition, this method cannot be accomplished continuously, but must be done on a regularly scheduled basis.

Another cleaning method in use, prior to the present invention, for facilities, such as water treatment plants, includes flushing the fluid transport system with relatively large quantities of chemicals. These chemicals include chlorine or potassium chloride. While this prior art process can be conducted in a more or less continuous manner, it is not efficient or cost-effective to induce large quantities of chemicals into the desired fluid medium. Furthermore, in some cases, these chemicals may be detrimental and must later be separated out. Separation of these chemicals from the fluid medium will obviously add to the operating cost of the facility. This cost is then passed on to the consumers.

As discussed in the above-referenced articles, at least three types of problems have already been identified with Zebra-Mussel fouling in water intake systems. Initially, layers of attached mussels will reduce and eventually block the flow of the fluid medium through such intake systems. This reduced and/or blocked flow will occur even through relatively large-diameter piping, trash racks, and traveling screens. Eventually, shells or clumps of shells breaking free of their attachment sites can block the openings in down stream piping, heat exchangers, strainers, or traveling screens. Finally, the Zebra Mussel attachment points will accumulate other debris and serve as sites for detrimental corrosion. There are a number of Environmental Protection Agency (EPA) approved chemical methods that have been tried in US powerplants. These methods include chlorination, the most discussed method; bromination, primarily Acti-brom, a Nalco Chemical Co (Naperville, Ill) product; and Betz Laboratories' (Trevose, Pa.) Clam-trol. Several other chemical treatments have been tried in laboratory tests, but not in a utility or industrial environment. Chlorination is the most common chemical control for Zebra-Mussel fouling. Continuous chlorination at 0.3 ppm for up to three weeks is required to achieve efficacy. Intermittent chlorination programs, that feed a few hours daily have generally been found to be ineffective. Using other chemicals- such as ozone, hydrogen peroxide, and potassium permangenate is possible, but expensive, environmentally unsound, and/or impractical to distribute throughout a cooling system.

It has been reported that Detroit Edison is trying to control Zebra Mussels by scraping and hydroblasting during regularly scheduled maintenance. Janiece Romstadt, on the other hand, has received federal permission to use a commercial mollucicide. Ontario Hydro is treating some of its coolant with hypochlorite, an oxidant that chews away at the soft parts of the organism and is the active ingredient in household bleach; the utility admits, however, that this short-term solution is offensive to the general public anxious about the environment. One other alternative is ozonation. Like hypochlorite, ozone is an oxidant; it is also environmentally benign. But it is extremely expensive. Ontario Hydro estimates that ozonation would cost them about $9 million per plant.

One member of the U.S. Fish and Wildlife Service, puts the bill for re-engineering, maintenance, and other forms of Zebra Mussel abatement at almost half a billion dollars a year. But none of the emergency measures tried to date, even though they may alleviate specific problems here and there, will do anything to halt the overall proliferation of Zebra Mussels. These mussels are very strongly byssate and they will attach to the insides and occlude the openings of industrial and domestic pipelines, clog underground irrigation systems of farms, greenhouses, and any other facility that draws water directly from a body of water containing these mussels, encrust navigation buoys to the point of submerging them, and encrust hulls of boats and other types of sailing craft that remain in the water over the summer and fall. The mussels may also become a significant vector of parasites that are lethal to game species of waterfowl and fish.

In the November 1991 issue of "Underwater USA" a news article appeared which indicated that, the tiny but dreaded Zebra Mussel has been discovered for the first time in a section of the Mississippi River near La Crosse, Wis., a U.S. Fish and Wildlife Service toxicologist reports.

Another expert says that he expects to see the Zebra Mussel population explode by next year. Worse, it's likely that boaters will inadvertently introduce the Zebra Mussels to Minnesota lakes. These mussels have an extremely hard shell and clog water intakes at power plants and municipal water systems. For example, the Monroe, Mich., water supply system was crippled for three days when the mussels clogged an intake pipe. Consequently, the consumers water bills increased 18 percent to pay for the cost of removing them.

An Ontario electric company spent $10 million on chlorine to keep the mussels out of power plant water intake pipes.

This same expert expects the same things to happen at power and water plants located along the Mississippi River. He says locks and dams also are favored attachment sites for the mussels, which cause leaks and prevent flood control gates from closing completely.

It can be seen from the above discussion that control of living marine organisms in a body of water, such as lakes and rivers, is a significant problem. It is also evident that not one of the solutions, suggested in the prior art to date, have been totally effective in controlling the problem.

It can also be seen from the above description that, to the best of applicants knowledge, no attempt has been made to control adherence to and buildup of Zebra Mussels on exposed surfaces of submerged components and structures using an electrical field.

SUMMARY OF THE INVENTION

The present invention provides a method which will substantially minimize both the detrimental adherence to and the buildup of living marine organisms on the exposed surfaces of various components and/or structures which must be submerged in a fluid medium containing these living marine organisms. In addition, the method of the present invention will simultaneously minimize the danger to higher forms of animal life which may be present in such fluid medium. This method includes determining at least one component and/or structure, which is submerged in the fluid medium containing the living marine organisms, to be protected. Further, determining both the size and shape of such component and/or structure to be protected. In this method, it is determined if the material such component to be protected is manufactured from is a material that would be capable of conducting a current therethrough. The method further includes the step of positioning at least one electrode at a predetermined location adjacent the exposed surface of such component and/or structure to be protected. A system to create a current flow path is provided by positioning a second electrode, which is spaced a predetermined distance from the other electrode and at a predetermined location, adjacent such exposed surface of the component and/or structure to be protected; when it has been determined that the material such component is manufactured from is a non conductive material. On the other hand, when the component and/or structure to be protected is a material which will conduct a current therethrough, the system to create the current flow path can be provided by at least one of a positive and a negative electrode and such material the component is manufactured from. After the system to create such current flow path is established and in position, a predetermined voltage is applied to such system for a predetermined time. Application of such voltage to the system will generate an electrical field between the electrodes. Such electrical field within the range of 3 to 10 volts per linear inch of spacing between electrodes, has an intensity level which is at least sufficient to cause the living marine organisms to close. However, the electrical field generated will have an intensity level below that which could represent a danger to higher forms of animal life. The closing of such living marine organisms substantially destroys their ability to adhere to and buildup on such at least one component and/or structure to be protected.

According to another aspect of the present invention, there is provided a method to substantially minimize the undesirable aherence to and buildup of living marine organisms on the exposed inner surfaces of a generally round pipe. Such pipe being capable of conducting an electrical current therethrough and being submerged in a fluid medium containing such living marine organisms. Use of this method, in this specific application, will simultaneously minimize the danger to higher forms of animal life which may be present in the fluid medium. According to this method, both a length and a diameter of such generally round pipe to be protected is determined. At least one electrode is positioned at a predetermined location substantially along the entire length of such pipe. A system is provided to create an electrical current flow path utilizing the at least one electrode and the generally round pipe capable of conducting an electrical current therethrough. After the system is created, a predetermined voltage is applied thereto to create the electrical current flow path. Such voltage being applied for a predetermined time. Application of this predetermined voltage to the system generates an electrical field having an intensity level which is at least sufficient to cause the living marine organisms present in the fluid medium to close. Additionally, the intensity level of such electrical field is below that which would represent a danger to the higher forms of animal life present in the fluid medium. Closing of the living marine organisms significantly reduces their ability to adhere to and buildup on the exposed inner surface of the generally round pipe being protected.

In a final aspect, the present invention provides a method to substantially minimize both an undesirable adherence to and buildup of living marine organisms on the exposed surface of a water intake screen. Such water intake screen being capable of conducting an electrical current therethrough. Such water intake screen being submerged in a body of water containing the living marine organisms. Simultaneously, use of this method substantially minimizes the danger to higher forms of animal life which may be present in such body of water. According to this method, a determination is made of both the length and shape of such water intake screen to be protected. A plurality of at least one of positive electrodes and negative electrodes are positioned at a plurality of predetermined locations adjacent the water intake screen. A system is provided to create an electrical current flow path which utilizes the plurality of such at least one of such positive electrodes and negative electrodes and the water intake screen. A predetermined voltage is applied to the system for a predetermined time to create such electrical current flow path. Application of this predetermined voltage to the system generates an electrical field which has an intensity level that is at least sufficient to cause the living marine organisms to close and further having an intensity level below that which would represent a danger to other forms of animal life. Closing of the living marine organisms substantially minimizes their ability to adhere to and buildup on the exposed surface of such water intake screen being protected.

OBJECTS OF THE INVENTION

It is, therefore, one of the primary objects of the present invention to provide a method of controlling living marine organisms which is effective in preventing these marine organisms adhering to and building up on the exposed surfaces of components submerged in the fluid medium containing such living marine organisms.

Another object of the present invention is to provide a method of controlling living marine organisms which is relatively simple to preform and versatile to use.

Still another object of the present invention is to provide a method of controlling living marine organisms which can be used to protect existing components and structures.

A further object of the present invention is to provide a method of controlling living marine organisms which is relatively inexpensive.

An additional object of the present invention is to provide a method of controlling living marine organisms which does not present a hazard to higher forms of animal life.

Yet another object of the present invention is to provide a method of controlling living marine organisms which can operate using either an A.C. or a D.C. current.

Still yet another object of the present invention is to provide a method of controlling living marine organisms in which an electrical field is established for controlling such living marine organisms.

It is a further object of the present invention to provide a method of controlling living marine organisms in which an electrical field is established to control such living marine organisms and the component and/or structure to be protected is used as one of a positive electrode and a negative electrode.

These and various other objects and advantages of the present invention will become more readily apparent to those persons who are skilled in the art from the following more detailed description of the invention, particularly, when such description is taken in conjunction with the appended claims.

BRIEF DESCRIPTION OF THE INVENTION

As is well known, there are many components and/or structures which must be submerged in a fluid medium that are susceptible to having living marine organisms attach themselves to and then buildup on the exposed surfaces of these submerged components and/or structures. The present invention provides a method of substantially minimizing this undesirable adherence to and buildup of these living marine organisms on the exposed surfaces of certain predetermined components and/or structures submerged in the fluid medium containing these living marine organisms. At the same time, the instant this invention minimizes the danger to other higher forms of animal life which may be present in such fluid medium.

As used in this specification and claims, the term "higher forms of animal life" includes, but is not limited to, game fish and humans who may be swimming in the fluid medium.

According to the presently preferred embodiment of the invention, the method includes making a determination of at least one component and/or structure, which is submerged in the fluid medium containing the living marine organisms, to be protected. Once the component and/or structure to be protected is determined, the size and shape of the exposed surfaces to be protected of the selected component must be determined. It is also desirable to determine the material such at least one component and/or structure to be protected is manufactured from. This is desirable in order to make a determination as to whether or not the material is capable of conducting a current therethrough. In some cases, for example, when the component and/or structure is manufactured from a material capable of conducting a current therethrough, it may be desirable to utilize the component and/or structure as part of a system provided to create an electrical current flow path.

In any event, the method requires positioning of at least one electrode at a predetermined location adjacent an exposed surface of such at least one component and/or structure to be protected. When it has been determined that the material such at least one component and/or structure is manufactured from is a non-conductive material, the system provided must include at least one second electrode. Therefore, in this case, the method includes the step of positioning the second electrode, spaced a predetermined distance from the other electrode, and at a predetermined location adjacent the exposed surface of the component and/or structure to be protected.

It can be seen from the above description that the system to create an electrical current flow path can be provided by either a separate positive electrode and a separate negative electrode or by an electrode, which may either be positive or negative, and the component and/or structure, which can serve as either a positive or negative element of the system to create such electrical current flow path. Once the system to create such electrical current flow path is in place, a predetermined voltage is applied to the system for a predetermined time period. This creates an electrical field. The amount of voltage applied is at least sufficient to create an electrical field which has an intensity that is at least sufficient to cause such living marine organisms to close. However, the voltage applied in less than an amount which would cause intensity of the electrical field to be above that which could represent a danger to the higher forms of animal life present in the fluid medium. The closing of such living marine organisms will substantially inhibit if not destroy their ability to adhere to and buildup on the exposed surfaces of the component and/or structure to be protected.

According to the preferred embodiment of this invention, the method of controlling adherence to and buildup of living marine organisms on the exposed surfaces of submerged components and/or structures includes the additional step of determining the electrical conductivity of the fluid medium in which the component structure and/or are submerged. Normally this fluid medium would be water such as, for example, lake and river water.

In many instances this method will be used to protect water intake components and structures. Many of these components and structures are manufactured from a material that is capable of conducting a current therethrough. Such materials, for example, can be metal or other material which conduct current. In this case, to minimize the cost of the system, it may be desirable to utilize the components and/or structures to be protected as one of the electrodes. The system for practicing the method of this invention can be designed such that the component and/or structure can be used as a positive or a negative electrode.

It has been discovered that when the component is used as one of the electrodes, as little as 3 volts per linear inch of spacing between the component and electrode will deter the adherence to the exposed surface of the component by such living marine organisms.

The predetermined spacing between electrodes will depend on a number of factors. These factors at least include the conductivity of the fluid medium and the current carrying capability of the different electrodes. In any event, it is preferred that the voltage applied to such electrodes will be at least about five volts per linear inch of spacing between the at least one electrode and a second electrode or the at least component and/or structure when such component and/or structure is used as one of the electrodes. Preferably, such voltage applied to the electrode will be between about five volts and about ten volts per linear inch of spacing between such at least one electrode and such second electrode or component.

It is also possible, when using the system to practice the method of the present invention, that the voltage being applied to such system can be applied on an intermittent bases. When such voltage is applied intermittently, for example, it may be on for as little as thirty seconds and off for as little as thirty seconds.

Additionally, in the presently preferred embodiment of the invention, the system utilized to practice the invented method to practice the invented method will be capable of generating modified wave forms to achieve the most effective control of the living marine organisms present in the fluid medium. Also, the current may be either A.C. or D.C.. It is presently preferred, in most cases contemplated, that such current will be A.C..

The method taught by the invention has been found to be particularly effective in causing Zebra Mussels to close and thereby, inhibit their ability to adhere to the various components and/or structures submerged in the fluid medium containing them.

A first trial was conducted using electrified plates and rods for control of Zebra Mussels. In this first trial a flow-through experiment was set up to test the efficacy of electrified plates and rods to control Zebra Mussels. A jet pump was installed to supply water to four wooden aquaria, two containing 12 steel plates in each and two containing 8 steel rods in each. All tests were carried out in a trailer at the Canada Centre for Inland Waters using water from Hamilton Harbour.

A single mussel was placed between the 12 plates (total 11 mussels) in each of the aquaria with metal plates. A total of 63 mussels (7 rows with 9 columns of mussels) were placed in the aquaria with the steel rods at approximately 2 inches apart. Of the 63 mussels, 29 were placed on acrylic coupons and the remainder were placed on the wooden base. The two outermost columns of mussels were essentially outside the electric field and received approximately 1.2 volts as determined by holding the two probes of the voltmeter on either side of a mussel. The voltage potential applied across the plates and rods was 16 volts, or 8 volts per inch.

A mussel monitor was installed to monitor settlement of mussels, if and when it occurred. The aquaria were examined periodically to determine mussel mortality. All dead mussels were removed after each period of observation. The results of this trial showed a heavy growth of slime, probably *Sphaerotilus natans*, had developed in all aquaria after a period of time. Long strands were seen attached to the walls of the aquaria, as well as on the rods and plates. A thick growth of slime had developed around the outflows of each wooden tank after onset, reducing the water flow out of the tanks. This probably aggravated the problem of slime formation. The slime had reduced the voltage potential down to about 2.5 volts per inch. There was no slime in the mussel monitor, suggesting that the wood in the aquaria may have caused or at least contributed to the formation of the slime. *Sphaerotilus natans* is especially common below outfalls of pulp and paper mills and readily forms in slow rivers that carry effluents with wood products. With the electrified plates, in spite of a the slime formation, the effect of the electrified plates was still readily apparent. Within 3 days of the experiment, most of mussels had already died in the aquaria with the electrified plates, with no mortality in the control aquarium (Table 1). Soon after the trial began, all mussels were dead in the tanks with the electrified plates. Moreover, none of the mussels had attached to either the acrylic coupons or wooden bases in the tank with the electrified plates. With the electrified rods, although only 2 of the mussels in the tank with electrified rods had died within 3 days, there was nearly 100% mortality of the mussels found two weeks after exposure. All but two of the mussels found were unattached by byssal threads. The 2 mussels that were attached were outside the electrified rods but the voltage potential across the mussels ranged was 0.4 volts for one and 1.2 volts for the other. Of the 63 mussels placed in the electrified tank, only 52 were found. However, another 8 mussels were found attached to the wooden floor of the tank, below the wooden base holding the rods. Since the voltage was disconnected to clean the tanks, the voltage across the mussels was not determined.

There was less than 10% mortality in the rod control tank. Nearly all (33 of 36) of the mussels had attached to either the coupons or the wooden bases in the control aquaria. In the control aquarium with rods there was considerable movement of mussel, with many attached to the walls. Of the 63 mussels placed in the aquarium, only 44 were found during the observation period. However, when the tanks were cleaned, 14 mussels were found on the floor of the tank, below the wooden base of the rod holder. It is not known what happened to the remaining 5 mussels; perhaps they went out the outflow of the tank. Although there was considerable slime formation, 8 volts per inch was effective at killing the mussels over a two week period.

TABLE 1

Condition of zebra mussels in aquaria with electrified plates and rods. A total of 11 mussels were placed in aquaria with plates and 63 mussels in aquaria with rods. Many mussels had moved to the walls or the floor (under the wooden floor holding the rods) in aquaria with rods.

| | Electrified Plates | | | Control Plates | | | Electrified Rods | | | Control Rods | | |
|---|---|---|---|---|---|---|---|---|---|---|---|---|
| Date | Dead | No. Attached | Temp. | Dead | No. Attached | Temp. | Dead | No. Attached | Temp | Dead | No. Attached | Temp |
| Sept 13 | 11 | 0 | 19.8 | 0 | 11 | 19.8 | 2 | 0 | 19.8 | 0 | 33 | 16.9 |
| Sept 21 | 11 | 0 | 16.0 | 0 | 11 | 16.0 | 44 | 0 | 16.0 | 0 | 36 | 16.9 |
| Sept 24 | 11 | 0 | 16.9 | 0 | 11 | 16.8 | 52 | 0 | 16.9 | 0 | 58 | 16.9 |

In a second trial, after recording data for each of the aquaria in Trial 1, all mussels were removed. Since the water was fouled with slime (probably *Sphaerotilus natans*, see results in Trial 1) the aquaria were scrubbed clean and half the water in each aquarium was replaced with fresh water. New mussels were replaced in each aquarium and placed with the long axis (front to back) at right angles to the direction of the rods and plates and approximately midway between the plates and rods. This would help us to determine if some or all the mussels moved before reattaching themselves, if the mussels did reattach.

The voltage potential between the plates and rods was exactly 16 volts (8 volts/inch). The temperature of the water varied by about 0.1° C. between the nearest inflow tank (i.e. 16.8° C. for the rod control aquarium) and the farthest outflow tank (i.e. 16.9° C. for the electrified plate aquarium). FIG. 1 shows the arrangement of mussels in each of the aquaria at time 0. The trial (#2) will continue until either all mussels are dead in the electrified aquaria or 10% of the mussels are dead in the control aquaria. All dead mussels were removed after each week of observation. Photographs were taken of all aquaria before recording data beginning on week 1.

The extent of slime formation in Trial #2 was substantially reduced, probably because the wood walls of the aquaria had been conditioned. The flow rate through all aquaria was also greatly improved, all in part because of reduced slime formation at the outflows.

The effect of electrified plates and rods on mussels was clear: Nearly all mussels (80%) between the electrified plates were dead; the remaining 20% (B,E, Table 1) were closed but not attached. One of the 11 mussels could not be found (A, Table 1), and was probably moved off and under the rack by water currents. At the completion of the trial, the missing mussel will be located and its condition (live or dead ) will be determined. In contrast, 7 of 11 mussels were actively siphoning and firmly attached to either acrylic coupons or to the wood base in the control aquarium (Table 2). Three of the mussels were gone (D,F,J, Table 2); these will be located at the end of the trial and their condition (live or dead ) will be determined. One mussel was closed but firmly attached to the acrylic coupon (E, Table 2).

The effect of electrified rods on mussels was equally as evident as the electrified plates: 6 of 21 mussels were dead and gaping (Table 3); the remaining mussels were closed but none were byssally attached to either the coupons or the wood base. Moreover, very few had moved since most mussels were still in approximately the same position as placement at time 0 (see methodology). In contrast, 16 of 21 mussels were actively siphoning and firmly attached in the control aquarium (Table 4). There was considerable mussel movement since 5 of the mussels were gone and virtually all of the attached mussels had assumed an orientation and location different than at time 0 (see methodology).

TABLE 1

Condition of mussels in aquarium with plates electrified at 16 volts between plates after 1 week in Trial 2. See FIG. 1 for position of mussels in aquarium. Water temperature = 14.6° C.

| A | B | C | D | E | F | G | H | I | J | K |
|---|---|---|---|---|---|---|---|---|---|---|
| G | C | D | D | C | D | D | D | D | D | D |

G = Mussel gone
C = Mussel shell closed
D = Mussel dead with valves gaping

TABLE 2

Condition of mussels in aquarium with control plates (not electrified) after 1 week in Trial 2. See FIG. 1 for position of mussels in aquarium. Water temperature = 14.6° C.

| A | B | C | D | E | F | G | H | I | J | K |
|---|---|---|---|---|---|---|---|---|---|---|
| OA | OA | OA | G | CA | G | OA | OA | OA | G | OA |

G = Mussel gone
OA = Mussel opened, actively siphoning and attached to coupon or wood base
CA = Mussel shell closed but firmly attached to coupon or wood base

TABLE 3

Condition of mussels in aquarium with rods electrified at 16 volts between rods after 1 week in Trial 2. See FIG. 1 for position of mussels in aquarium. Water temperature = 14.6° C.

| Row | A | B | C | D | E | F | G |
|---|---|---|---|---|---|---|---|
| 1 | C | C | D | D | D | D | C |
| 2 | C | C | C | C | C | D | D |
| 3 | C | C | C | C | C | C | C |

G = Mussel gone
C = Mussel shell closed but not attached
D = Mussel dead with valves gaping, not attached

TABLE 4

Condition of mussels in aquarium with control rods (not electrified) after 1 week in Trial 2. See FIG. 1 for position of mussels in aquarium. Water temperature = 14.6° C.

| ROW | A | B | C | D | E | F | G |
|---|---|---|---|---|---|---|---|
| 1 | 2OA | G | OA | OA | OA | OA | OA |
| 2 | 2OA | OA | OA | OA | G | OA | OA |
| 3 | OA | G | 3OA | OA | G | 2OA | G |

G = Mussel gone
OA = Mussel opened, actively siphoning and attached to coupon or wood base
CA = Mussel shell closed but firmly attached to coupon or wood base In a third and final trial, as in the second trial, after recording data for each of the aquaria in Trial 2, all mussels were removed. All tanks were cleaned of silt by siphoning with a hose to waste. About half of the water in each tank was removed in the process. New mussels were replaced in each aquarium and placed with the long axis (front to back) at right angles to the direction of the rods and plates and approximately midway between the plates and rods, as in previous trials. A schematic diagram of the setup is shown in FIG. 1.

The voltage potential between the plates and rods was reduced to exactly 12 volts (6 volts/inch). The temperature of the water varied by about 0.2° C. between the nearest inflow tank (i.e. 15.3° C. for the rod control aquarium) and the farthest outflow tank (i.e. 15.5° C. for the electrified plate aquarium). FIG. 1 shows the arrangement of mussels in each of the aquaria at time 0. Trial #3 is to continue until either all mussels are dead in the electrified aquaria or 10% of the mussels are dead in the control aquaria. All dead mussels are removed after each week of observation. Photographs are taken of all aquaria before recording data beginning on week 1 and each week thereafter before observations are made.

There was no slime formation at all in Trial #3. However, considerable amounts of silt and probably some pseudofaeces collected in the tanks. Although both plates and rods were covered in silt, electric potentials could be read but were maximum (6 volts/inch) only when the metal was touched by the electric probes. Very rarely was it possible to detect any potential when measured on each side of dead mussels.

The effect of electrified plates at 6 volts/inch on mussels was clear after 1 week; nearly all mussels (90%) between the electrified plates were dead; the remaining 10% (1 mussel, I, Table 1) was closed but not attached.

In contrast, 11 of 11 mussels were actively siphoning and firmly attached to either acrylic coupons or to the wood base in the control aquarium (Table 2).

After 2 weeks, 100% mortality of adult mussels was observed on the electrified plates (Table 5), in spite of a layer of silt on the plates. None of the mussels had attached by byssal threads. In contrast, all mussels were attached and actively siphoning in the control with plates (see photographs). A layer of silt was also on the control plates. As in the mussel monitor, there was no veliger settlement in the tanks with plates.

There was little effect of electrified rods at 6 volts/inch on mussel mortality after 1 week (only 1 dead (9%), Table 3) and 2 weeks (3 dead (14%), Table 7). However, byssal secretion was clearly affected since none of the living mussels was attached to either the wood base or acrylic coupons. This was in direct contrast to the control tanks where all mussels were attached and actively siphoning (Tables 4, 8). Moreover, there was considerable movement of mussel in the control tank and little or none in the electrified tanks since mussels had not reoriented themselves and were still in approximately the same position as placement at time 0.

After 3 weeks, a thick layer of silt had collected on the rods (both electrified and controls), but 9 mussels were dead (=42% mortality) and decomposing in the tank with the electrified rods (Table 9, see photographs). In contrast, all mussels were alive, actively siphoning (see photographs), and firmly attached by byssal threads in the control tank (Table 9).

After 4 weeks 12 mussels were dead (57% mortality) in the electrified tank, the remaining mussels were open and actively siphoning but none were byssally attached (Table 10). The voltage potential was not detectable until the metal rods were touched at which point the potential read 6 volt/inch. There was no change in the status of mussels in the control tank between the third and fourth week (compare Tables 9 and 11).

Because the silt formation was so high after 4 weeks in the tanks with rods (electrified and control), the silt was siphoned off (see photographs), with attention paid especially to cleaning the rods. The voltage was remeasured and still at 6 volts/inch and left that way.

A voltage potential of 6 volts per inch was clearly effective at not only preventing attachment by adults to electrified plates, but also at killing the mussels. Although 6 volts/inch with rods was not effective at killing mussels it is effective at preventing byssal attachment for at least up to 6 weeks.

TABLE 1

Condition of mussels in aquarium with plates electrified at 12 volts between plates after 1 week in Trial 3. See FIG. 1 for position of mussels in aquarium. Water temperature = 13.1° C.

| A | B | C | D | E | F | G | H | I | J | K |
|---|---|---|---|---|---|---|---|---|---|---|
| D | D | D | D | D | D | D | D | C | D | D |

G = Mussel gone
C = Mussel shell closed
D = Mussel dead with valves gaping

TABLE 2

Condition of mussels in aquarium with control plates (not electrified) after 1 week in Trial 3. See FIG. 1 for position of mussels in aquarium. Water temperature = 13.0° C.

| A | B | C | D | E | F | G | H | I | J | K |
|---|---|---|---|---|---|---|---|---|---|---|
| OA | OA | OA | OA | OA | OA | OA | OA | OA | OA | OA |

OA = Mussel opened, actively siphoning and attached to coupon or wood base
CA = Mussel shell closed but firmly attached to coupon or wood base

TABLE 3

Condition of mussels in aquarium with rods electrified at 12 volts between rods after 1 week in Trial 3. See FIG. 1 for position of mussels in aquarium. Water temperature = 13.0° C.

| Row | A | B | C | D | E | F | G |
|---|---|---|---|---|---|---|---|
| 1 | CD | OD | CD | D | OD | OD | OD |
| 2 | OD | OD | CD | CD | CD | OD | OD |
| 3 | CD | OD | OD | CD | CD | CD | OD |

CD = Mussel shell closed but not attached
D = Mussel dead with valves gaping, not attached
OD = Mussel open and siphoning but not attached

TABLE 4

Condition of mussels in aquarium with control rods (not electrified) after 1 week in Trial 3. See FIG. 1 for position of mussels in aquarium. Water temperature = 13.0° C.

| ROW | A | B | C | D | E | F | G |
|---|---|---|---|---|---|---|---|
| 1 | 3OA | G | OA | G | OA | OA | OA |
| 2 | OA | G | OA | G | 2OA | OA | OA |
| 3 | OA | 2OA | OA | OA | OA | OA | OA |

G = Mussel gone
OA = Mussel opened, actively siphoning and attached to coupon or wood base
CA = Mussel shell closed but firmly attached to coupon or wood base

TABLE 5

Condition of mussels in aquarium with plates electrified at 16 volts between plates after 2 weeks in Trial 3. See FIG. 1 for position of mussels in aquarium. Water temperature = 11.1° C.

| A | B | C | D | E | F | G | H | I | J | K |
|---|---|---|---|---|---|---|---|---|---|---|
| D | D | D | D | D | D | D | D | D | D | D |

G = Mussel gone
C = Mussel shell closed
D = Mussel dead with valves gaping

TABLE 6

Condition of mussels in aquarium with control plates (not electrified) after 2 weeks in Trial 3. See FIG. 1 for position of mussels in aquarium. Water temperature = 11.0° C.

| A | B | C | D | E | F | G | H | I | J | K |
|---|---|---|---|---|---|---|---|---|---|---|
| G | OA | OA | OA | OA | OA | OA | CA | OA | OA | OA |

G = Mussel gone
OA = Mussel opened, actively siphoning and attached to coupon or wood base
CA = Mussel shell closed but firmly attached to coupon or wood base

TABLE 7

Condition of mussels in aquarium with rods electrified at up to 12 volts between rods after 2 weeks in Trial 3. See FIG. 1 for position of mussels in aquarium. Water temperature = 11.0° C.

| Row | A | B | C | D | E | F | G |
|---|---|---|---|---|---|---|---|
| 1 | D | D | OD | D | OD | OD | OD |
| 2 | OD | OD | OD | OD | OD | OD | OD |
| 3 | D | OD | OD | OD | OD | OD | OD |

D = Mussel dead
OD = Mussel open and actively siphoning but not attached

TABLE 8

Condition of mussels in aquarium with control rods (not electrified) after 2 weeks in Trial 3. See FIG. 1 for position of mussels in aquarium. Water temperature = 10.9° C.

| ROW | A | B | C | D | E | F | G |
|---|---|---|---|---|---|---|---|
| 1 | 3OA | G | OA | G | OA | OA | OA |
| 2 | OA | G | OA | G | 2OA | OA | OA |
| 3 | OA | 2OA | OA | OA | OA | OA | CA |

G = Mussel gone
OA = Mussel opened, actively siphoning and attached to coupon or wood base
CA = Mussel shell closed but firmly attached to coupon or wood base

TABLE 9

Condition of mussels in aquarium with rods electrified at up to 12 volts between rods after 3 weeks in Trial 3. See FIG. 1 for position of mussels in aquarium. Water temperature = 9.7° C.

| Row | A | B | C | D | E | F | G |
|---|---|---|---|---|---|---|---|
| 1 | D | D | D | D | D | OD | OD |
| 2 | D | OD | OD | D | D | D | D |
| 3 | D | OD | OD | OD | OD | OD | OD |

D = Mussel dead
OD = Mussel open and actively siphoning but not attached

TABLE 10

Condition of mussels in aquarium with control rods (not electrified) after 2 weeks in Trial 3. See FIG. 1 for position of mussels in aquarium. Water temperature = 9.7° C.

| ROW | A | B | C | D | E | F | G |
|---|---|---|---|---|---|---|---|
| 1 | 3OA | G | OA | G | OA | OA | OA |
| 2 | OA | G | OA | G | 2OA | OA | OA |
| 3 | OA | 2OA | OA | OA | OA | OA | CA |

G = Mussel gone
OA = Mussel opened, actively siphoning and attached to coupon or wood base
CA = Mussel shell closed but firmly attached to coupon or wood base

TABLE 11

Condition of mussels in aquarium with rods electrified at up to 12 volts between rods after 4 weeks in Trial 3. See FIG. 1 for position of mussels in aquarium. Water temperature = 10.3° C.

| Row | A | B | C | D | E | F | G |
|---|---|---|---|---|---|---|---|
| 1 | D | D | D | D | D | OD | D |
| 2 | D | OD | OD | D | D | D | D |
| 3 | D | D | OD | OD | D | OD | OD |

D = Mussel dead
OD = Mussel open and actively siphoning but not attached

TABLE 12

Condition of mussels in aquarium with control rods (not electrified) after 2 weeks in Trial 3. See FIG. 1 for position of mussels in aquarium. Water temperature = 10.2° C.

| ROW | A | B | C | D | E | F | G |
|---|---|---|---|---|---|---|---|
| 1 | 3OA | G | OA | G | OA | OA | OA |
| 2 | OA | G | OA | G | 2OA | OA | OA |
| 3 | OA | 2OA | OA | OA | OA | OA | CA |

G = Mussel gone
OA = Mussel opened, actively siphoning and attached to coupon or wood base
CA = Mussel shell closed but firmly attached to coupon or wood base While a presently preferred and a number of alternative embodiments of the present invention have been described in detail above, it should be understood that various other modifications and adaptations of such invention may be made by those persons who are skilled in the art without departing from the spirit and scope of the appended claims.

I claim:

1. A method of substantially minimizing an undesirable adherence to and buildup of Zebra Mussels on exposed surfaces of predetermined components and structures which are submerged in fresh water containing said Zebra Mussels while simultaneously minimizing danger to higher forms of animal life present in such fresh water, said method comprising the steps of:

(a) determining at least one component, submerged in said fresh water containing said Zebra Mussels, to be protected;

(b) determining both a size and a shape of said exposed surfaces of said at least one component, determined in step (a), to be protected;

(c) determining if a material of said at least one component, determined in step (a), to be protected is capable of conducting an electrical current therethrough;

(d) positioning at least one electrode at a first predetermined location adjacent an exposed surface of said at least one component, determined in step (a), to be protected;

(e) providing a system to create an electrical current flow path by positioning a second electrode spaced a predetermine distance from said at least one electrode, positioned in step (d), and at a second predetermined location adjacent said exposed surface of said at least one component, determined in step (a), to be protected when it is determined in step (c) that said material said at least one component is manufactured from is a nonconductive material, said system to create said electrical current flow path being provided by at least one of: said at least one electrode and said second electrode, and, said at least one electrode and said component when said component is capable of conducting said electrical current therethrough;

(f) applying a voltage of between about 3 volts and about 10 volts per linear inch of spacing between said at least one electrode and said second electrode or between said at least one electrode and said at least one component to create said electrical current flow path, provided in step (e), for a predetermined time; and (g) generating an electrical field with said voltage applied in step (f), said electrical field having an intensity level which is at least sufficient to cause said Zebra Mussels to close and further having an intensity level below that which would represent a danger to said higher forms of animal life, closing of said Zebra Mussels substantially minimizes their ability to adhere to and buildup on said exposed surfaces of said at least one component, determined in step (a), to be protected.

2. A method, according to claim 1, wherein, at least prior to step (f), said method includes an additional step of determining an electrical conductivity of said fresh water in which said at least one component is submerged.

3. A method, according to claim 1, wherein said material said at least one component, determined in step (a), to be protected is manufactured from is capable of conducting a current therethrough and said at least one component serves as one of a positive electrode and a negative electrode.

4. A method, according to claim 1, wherein said predetermined voltage, applied step (f), is at least about 5 volts per linear inch of spacing.

5. A method, according to claim 4, wherein said material is metal.

6. A method, according to claim 1, wherein said is applied intermittently.

7. A method, according to claim 1, wherein said system, provided in step (e), is capable of generating modified wave forms.

8. A method, according to claim 1, wherein said electrical current flow path is one of an A.C. current flow path and a D.C. current flow path.

9. A method, according to claim 8, wherein said electrical current flow path is an A.C. current flow path.

10. A method, according to claim 1, wherein said system provided, in step (e), includes a plurality of alternating positive and negative electrodes.

11. A method, according to claim 1, wherein said material said at least one component is manufactured from is a material capable of conducting an electrical current therethrough and said at least one component serves as one of said electrodes and said system includes a plurality of one of positive electrodes and negative electrodes.

12. A method of substantially minimizing an undesirable adherence to and buildup of Zebra Mussels on an exposed inner surface of a generally round pipe capable of conducting an electrical current therethrough and is submerged in fresh water containing said Zebra Mussels while simultaneously minimizing danger to higher forms of animal life present in said fresh water, said method comprising the steps of:

(a) determining both a length and a diameter of said generally round pipe, submerged in said fresh water containing said Zebra Mussels, to be protected;

(b) positioning at least one electrode at a predetermined location along said length, determined in step (a), of said generally round pipe;

(c) providing a system to create an electrical current flow path utilizing said at least one electrode, positioned in step (b), and said generally round pipe capable of conducting said electrical current therethrough;

(d) applying a voltage of between about 3 volts and about 10 volts per linear inch of spacing between said at least one electrode and said pipe to create said electrical current flow path, provided in step (c), for a predetermined time; and (e) generating an electrical field with said voltage, applied in step (d), said electrical field having an intensity level which is at least sufficient to cause said Zebra Mussels to close and further having an intensity level below that which would represent a danger to said higher forms of animal life, closing of said Zebra Mussels substantially minimizes their ability to adhere to and buildup on said exposed inner surface of said generally round pipe to be protected.

13. A method, according to claim 12, wherein said fresh water is one of lake and river water.

14. A method, according to claim 13, wherein said at least one electrode, positioned in step (b), is positioned substantially along a longitudinal centerline of said generally round pipe.

15. A method, according to claim 14, wherein said electrical current flow path is one of an A.C. current flow path and a D.C. current flow path.

16. A method, according to claim 15, wherein said electrical current flow path is an A.C. current flow path. orientation and location different than at time 0 (see methodology).

17. A method, according to claim 12, wherein, at least prior to step (d), said method includes an additional step of determining an electrical conductivity of said fresh water said at least one component is submerged in.

18. A method, according to claim 12, wherein said predetermined voltage is applied intermittently.

19. A method, according to claim 18, wherein said system, provided in step (c), is capable of generating modified wave forms.

20. A method of substantially minimizing an undesirable adherence to and buildup of Zebra Mussels on an exposed surface of a water intake screen capable of conducting an electrical current therethrough and is submerged in a body of fresh water containing said Zebra Mussels while simultaneously minimizing danger to higher forms of animal life present in said body of fresh water, said method comprising:

(a) determining both a length and a shape of said water intake screen, submerged in said body of fresh water containing said Zebra Mussels, to be protected;

(b) positioning a plurality of electrodes at a plurality of predetermined locations adjacent said water intake screen;

(c) providing a system to create an electrical current flow path utilizing said plurality of electrodes, positioned in step (b), and said water intake screen;
(d) applying a voltage of between about 3 volts and 10 volts to said system to create said electrical current flow path, provided in step (c), for a predetermined time; and
(e) generating an electrical field with said voltage, applied in step (d), said electrical field having an intensity level which is at least sufficient to cause said Zebra Mussels to close and further having an intensity level below that which would represent a danger to said higher forms of animal life, closing of said Zebra Mussels substantially minimizes their ability to adhere to and buildup on said exposed surface of said water intake screen to be protected.

21. A method, according to claim 20, wherein said electrical current flow path is one of an A.C. current flow path and a D.C. current flow path.

22. A method, according to claim 21, wherein said voltage, is applied intermittently.

23. A method, according to claim 22, wherein said system is capable of generating modified wave forms.

* * * * *

UNITED STATES PATENT AND TRADEMARK OFFICE
CERTIFICATE OF CORRECTION

PATENT NO. : 5,417,820

DATED : May 23, 1995

INVENTOR(S) : Clois D. Fears

It is certified that error appears in the above-indentified patent and that said Letters Patent is hereby corrected as shown below:

Column 8, line 16, underline --Sphaerotilus natans--;
column 8, line 27, underline --Sphaerotilus natans--;

Column 9, line 15, please underline --Sphaerotilus natans--.
Column 15, line 3, delete "nonconductive" and insert --non-conductive--;

column 15, line 43, insert --voltage-- after said.
Column 16, line 42, delete "Orientation and location different than at time 0 (see methodology).".
Column 16, line 49, delete "predetermined" after said.
Column 18, line 9, delete "," after voltage.

Signed and Sealed this

Twelfth Day of December, 1995

Attest:

BRUCE LEHMAN

*Attesting Officer*  *Commissioner of Patents and Trademarks*